US009952419B2

(12) United States Patent
Stewart

(10) Patent No.: US 9,952,419 B2
(45) Date of Patent: Apr. 24, 2018

(54) OBJECTIVE LENS CHANGER FOR OPTICAL INSTRUMENTS

(71) Applicant: GE Healthcare Bio-Sciences AB, Uppsala (SE)

(72) Inventor: David Andrew Stewart, Seattle, WA (US)

(73) Assignee: GE HEALTHCARE BIO-SCIENCES CORP., Marlborough, MA (US)

(*) Notice: Subject to any disclaimer, the term of this patent is extended or adjusted under 35 U.S.C. 154(b) by 62 days.

(21) Appl. No.: 15/030,498

(22) PCT Filed: Oct. 29, 2014

(86) PCT No.: PCT/EP2014/073228
§ 371 (c)(1),
(2) Date: Apr. 19, 2016

(87) PCT Pub. No.: WO2015/063155
PCT Pub. Date: May 7, 2015

(65) Prior Publication Data
US 2016/0282595 A1 Sep. 29, 2016

Related U.S. Application Data

(60) Provisional application No. 61/897,923, filed on Oct. 31, 2013.

(51) Int. Cl.
*G02B 21/00* (2006.01)
*G02B 21/24* (2006.01)
(Continued)

(52) U.S. Cl.
CPC .......... *G02B 21/248* (2013.01); *G02B 7/004* (2013.01); *G02B 7/005* (2013.01); *G02B 7/14* (2013.01);
(Continued)

(58) Field of Classification Search
CPC ........ G02B 7/003; G02B 7/004; G02B 7/005; G02B 7/02; G02B 7/021; G02B 7/022;
(Continued)

(56) References Cited

U.S. PATENT DOCUMENTS 6,437,911 B1    8/2002   Hasegawa
2010/0309546 A1  12/2010  Seifert

FOREIGN PATENT DOCUMENTS

JP    11264938 A  *  9/1999  ........... G02B 21/248
WO   WO 03075071 A1 *  9/2003  ............... G02B 7/16

OTHER PUBLICATIONS

International Search Report and Written Opinion regarding International Application No. PCT/EP2014/073228, dated Jan. 15, 2015, 9 pages.

* cited by examiner

Primary Examiner — Arnel C Lavarias
(74) Attorney, Agent, or Firm — Rong Zhang

(57) ABSTRACT

The subject matter of the present disclosure generally relates to objective lens changers for optical instruments. In one embodiment, an objective lens changer includes an objective lens carrier moveably attached to a changer frame by a mechanical link arrangement. The objective lens carrier includes two or more objective lens positions. The mechanical link arrangement includes a first link section to provide translation of the objective lens carrier between the objective lens positions and a second link section arranged to control an alignment of the objective lens position with respect to the optical axis of the optical instrument.

11 Claims, 7 Drawing Sheets

(51) Int. Cl.
*G02B 7/00* (2006.01)
*G02B 7/14* (2006.01)
*G02B 21/06* (2006.01)
*G02B 21/16* (2006.01)
*G02B 21/36* (2006.01)

(52) U.S. Cl.
CPC .............. *G02B 21/06* (2013.01); *G02B 21/16* (2013.01); *G02B 21/36* (2013.01)

(58) Field of Classification Search
CPC . G02B 7/023; G02B 7/14; G02B 7/16; G02B 21/00; G02B 21/002; G02B 21/0024; G02B 21/0032; G02B 21/0076; G02B 21/248
USPC ....... 359/362, 363, 368, 381, 811, 812, 813, 359/814, 819, 821, 822
See application file for complete search history.

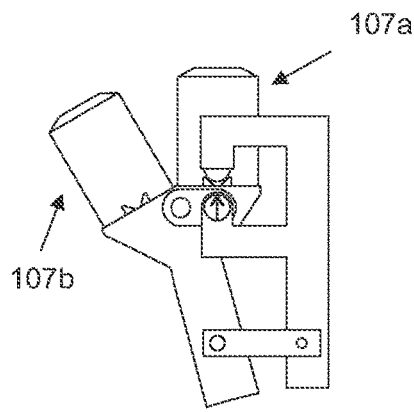
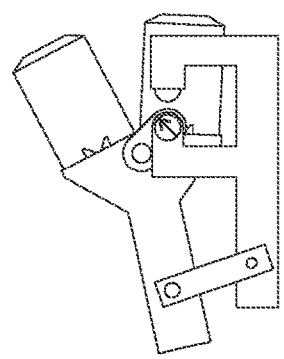
FIG. 6a  FIG. 6b
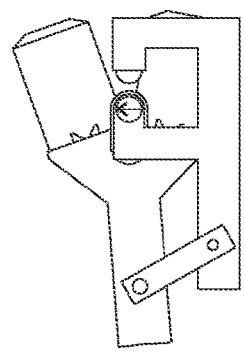
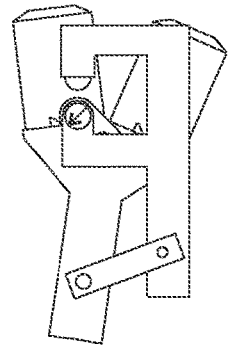
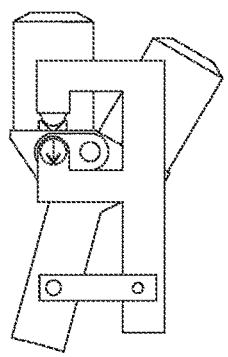
FIG. 6c  FIG. 6d  FIG. 6e

OBJECTIVE LENS CHANGER FOR OPTICAL INSTRUMENTS

CROSS-REFERENCE TO RELATED APPLICATIONS

This application is a filing under 35 U.S.C. 371 of international application number PCT/EP2014/073228, filed Oct. 29, 2014, which claims priority to U.S. application number U.S. 61/897,923, filed Oct. 31, 2013, the entire disclosures of each of which are hereby incorporated by reference.

FIELD OF THE INVENTION

The present invention relates to an objective lens changer and in particular to an objective lens changer for a microscope or other optical instruments, for selecting an objective of desired magnification among a plurality of objectives.

BACKGROUND OF THE INVENTION

In microscopes and other optical instruments there is often a need to provide different factors of magnification depending on what type of object is being imaged and the desired level of details. This is conventionally achieved by an objective lens changer carrying two or more lenses of different magnification that can be selectively positioned in the optical path of the optical instrument. FIG. 1 shows a prior-art objective lens changer 10 comprising an objective turret 20 with three objective lens positions 30, and wherein the turret is rotated about its center to change objective lens in the optical path. FIG. 2 shows an alternative objective lens changer 40 of pivotal type comprising two objective lens positions 30.

SUMMARY OF THE INVENTION

The object of the invention is to provide a new objective changer, which overcomes one or more drawbacks of the prior art. This is achieved by the objective lens changer as defined in the independent claim.

One advantage with such an objective lens changer is that it actively moves the objective lens away from the object to be imaged along the optical axis essentially before any translation to another objective lens position is initiated. Likewise, the objective lens is placed into final position by a movement along the optical axis. Hence, changing between objective lenses does not involve any movement transverse to the optical axis in the close vicinity of the object to be imaged.

Another advantage is that the objective lens changer provides a high degree of repeatability as a result of its kinematic design.

Further scope of applicability of the present invention will become apparent from the detailed description given hereinafter. However, it should be understood that the detailed description and specific examples while indicating preferred embodiments of the invention are given by way of illustration only. Various changes and modifications within the spirit and scope of the invention will become apparent to those skilled in the art from the detailed description below.

BRIEF DESCRIPTION OF THE DRAWINGS

FIGS. 6a-6e are schematic illustrations of the operation of an embodiment of the objective lens changer according to the present invention.

DETAILED DESCRIPTION OF THE INVENTION

The embodiments of the invention are described with reference to the drawings, where like components are identified with the same numerals. The descriptions of the embodiments are exemplary and are not intended to limit the scope of the invention.

Figure 1:
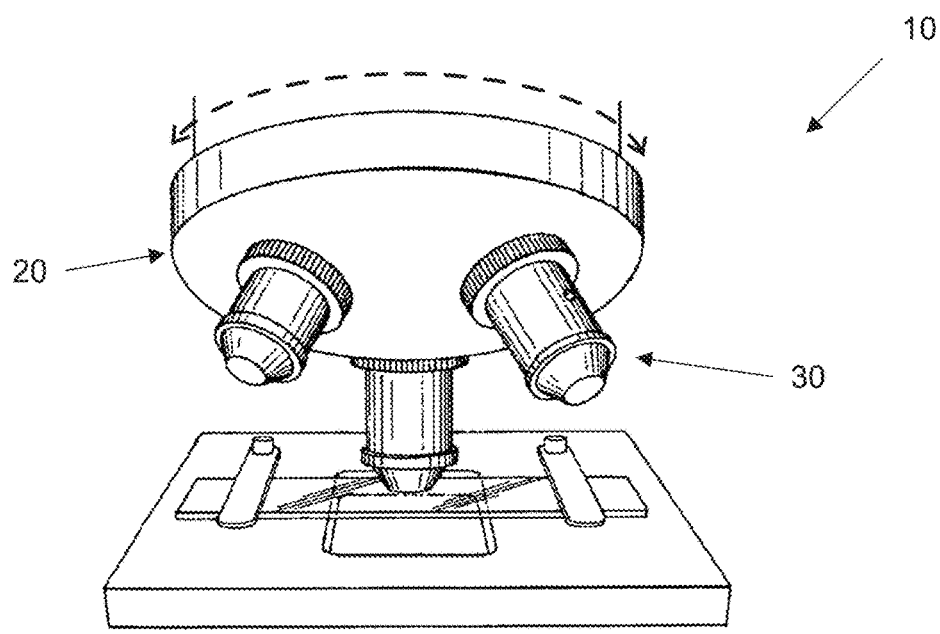
FIG. 1 is a schematic view of a prior art objective lens changer of turret type.
Figure 2:
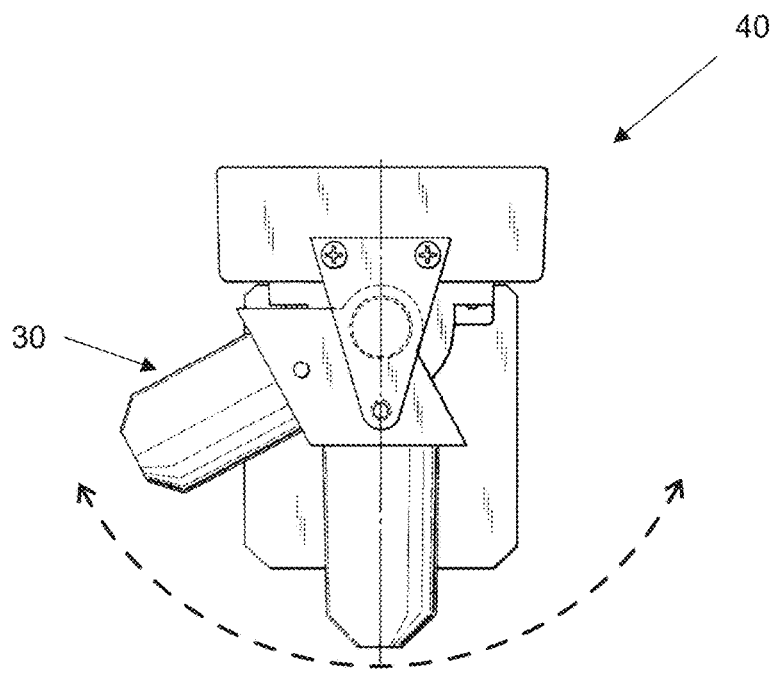
FIG. 2 is a schematic view of a prior art objective lens changer of pivot type.
Figure 3:
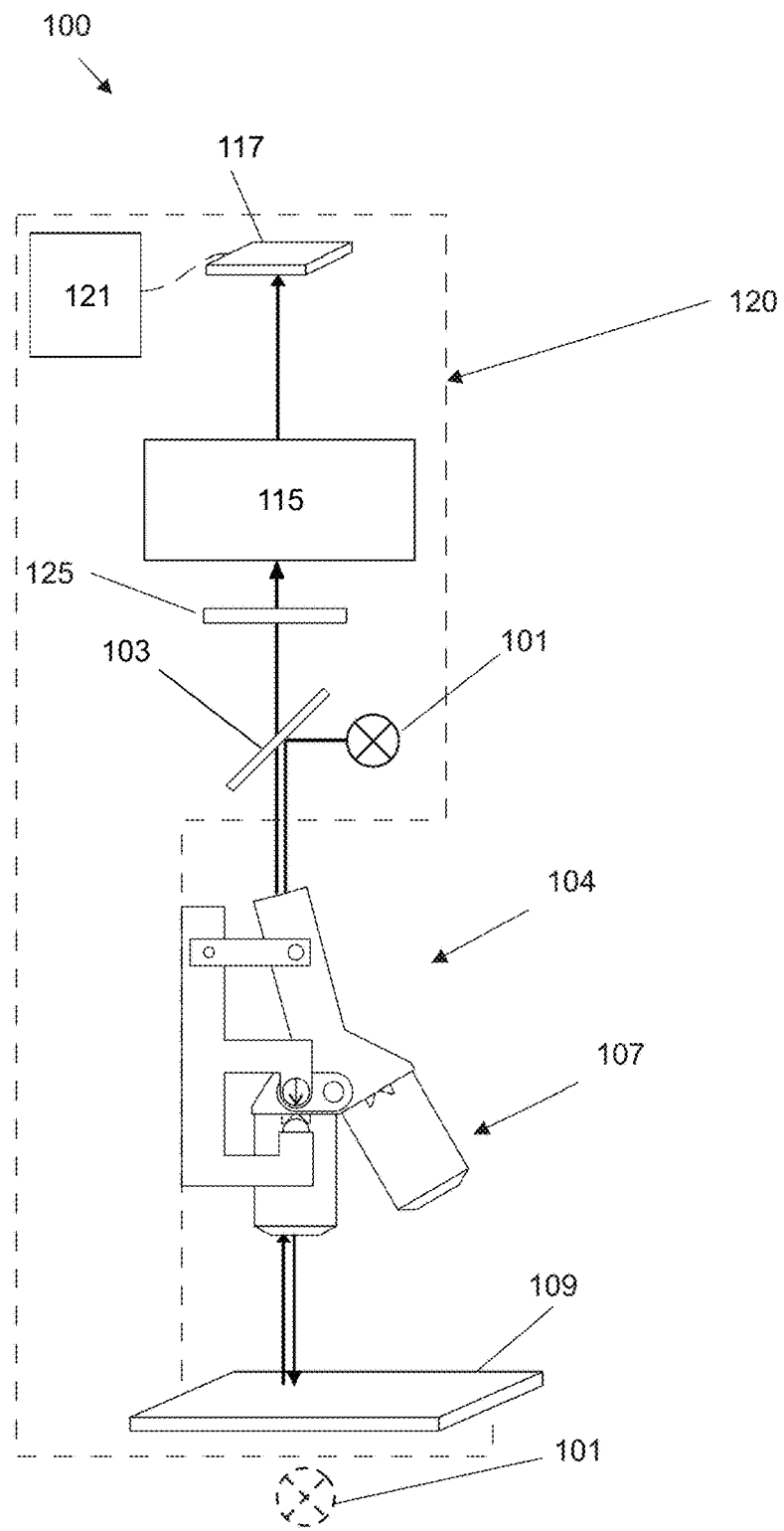
FIG. 3 is a schematic illustration of a microscope with an objective lens changer according to the present invention.

FIG. 3 illustrates the essential components of one embodiment of an optical apparatus in the form of a microscope system 100. The disclosed microscope system 100 includes the following components: a light source 101, a beam folding element 103, an objective lens changer 104 with two objective lenses 107, a sample holder 109, imaging optics 115, an image sensor unit 117, a housing 120, a control unit 121 and an optional filter 125. The system may contain other components as would ordinarily be found in confocal and wide field microscopes. The following sections describe these and other components in more detail. For a number of the components there are multiple potential embodiments. In general the preferred embodiment depends upon the target application.

The light source 101 can be any source capable of delivering light of suitable characteristics for the specific application, e.g. a conventional lamp, a Light Emitting Diode (LED), a laser source or the like. In one embodiment, the microscope may be a fluorescence microscope and the light source 101 can be any source capable of delivering light of the desired excitation wavelength to excite a fluorescent target, and the filter 125 may be arranged in the light path to remove the excitation light in the detection light path. As is indicated by the dotted lamp symbol in FIG. 3, the light source 101 may alternatively be arranged for trans-illumination of the sample to be imaged. In FIG. 3 the beam folding element 103 is arranged to introduce the light beam from the light source 101 into the imaging beam path of the microscope 100, and it may be comprised by a semi reflective mirror, a prism, a dichroic element or the like.

The objective lens changer 104, will be disclosed in greater detail below with reference to FIGS. 4 to 7. The sample holder 109, may be any conventional type of sample holder suitable for holding a sample in a microscope, and it may comprise translation means in the form of a stage or the like. The imaging optics 115 is comprised of any suitable optical components and is arranged to provide a projection of the object to be imaged on the image sensor unit 117. The image sensor unit 117 is comprised of any suitable optical sensor array or camera capable of detecting the light from an object on the sample holder and generating an image. Images captured by the image sensor unit 117 may be accessed by a control unit 121 for image processing etc. The control unit 121 may be integral to the microscope as is schematically disclosed or it may be comprises of an external computer or the like. In FIG. 3 a microscope housing or stand 120 is schematically shown by a dotted line with some components arranged inside the housing and some outside. However it should be noted that in some embodiments essentially all components are arranged inside a full housing 120, whereas in other embodiments, some or all components may be provided external to the housing and optionally be attached to the housing. In particular the objective lens changer 104 is illustrated as being attached to the housing 120.

Figure 4:
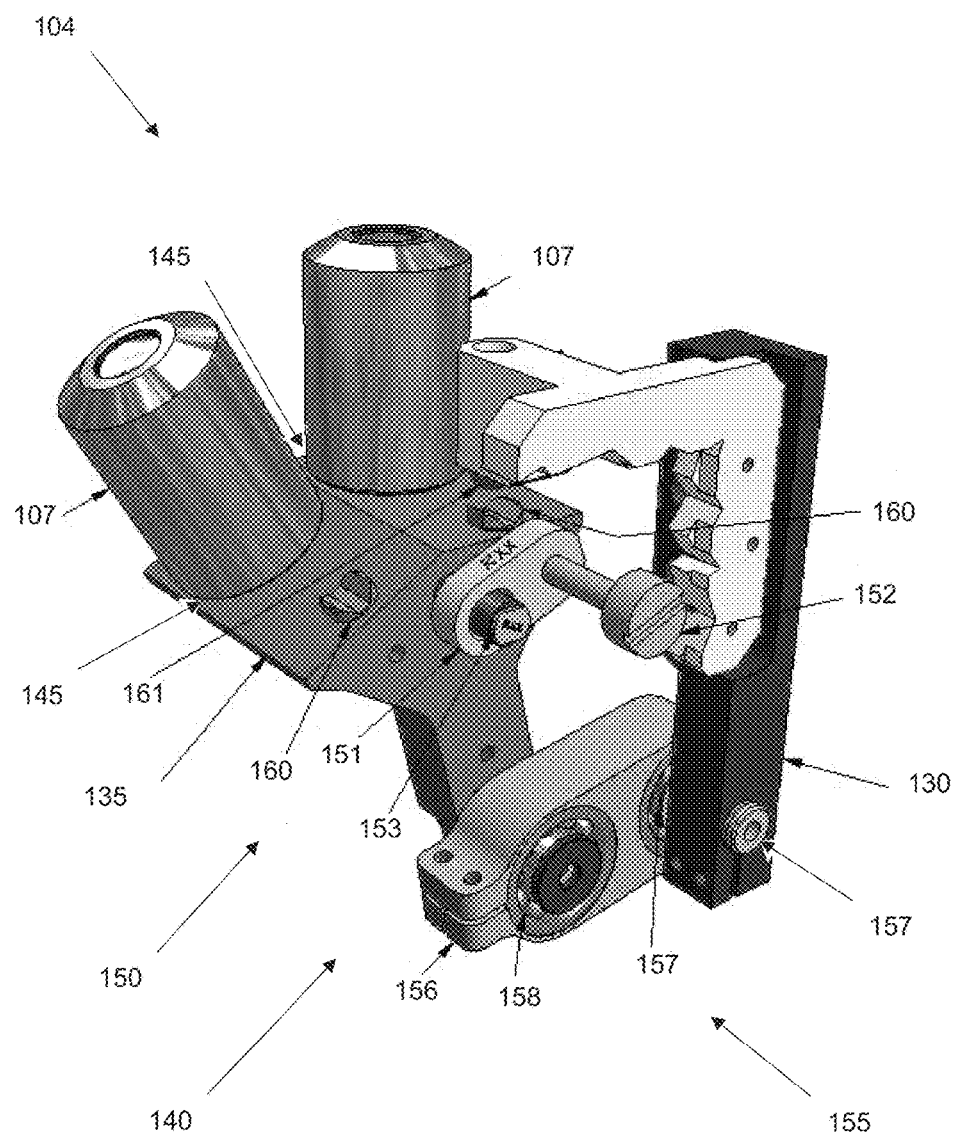
FIG. 4 is a schematic illustration of the operation of an objective lens changer according to the present invention.
Figure 5:
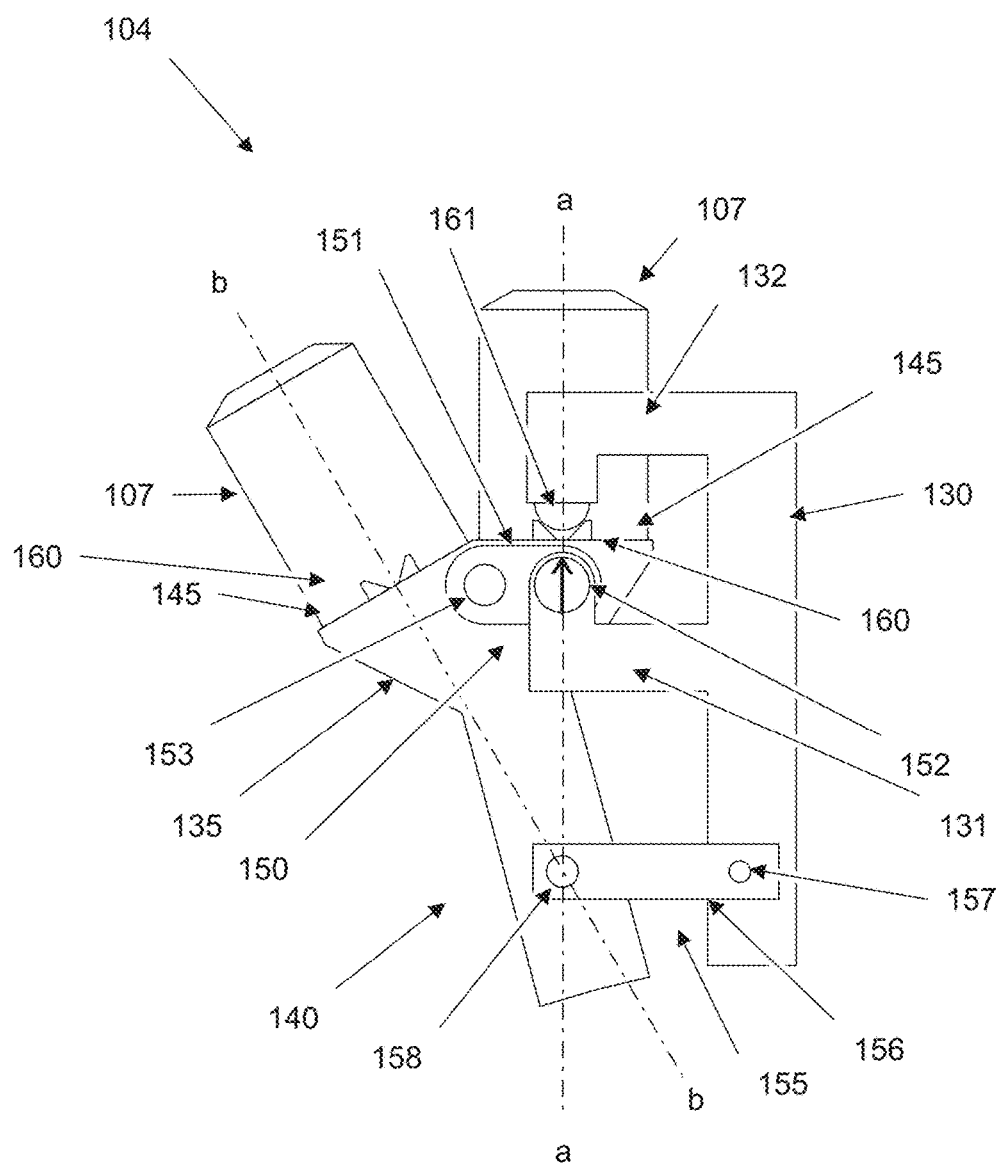
FIG. 5 is a schematic illustration of one embodiment of the objective lens changer according to the present invention.

FIG. 4 shows a perspective view of an objective lens changer 104 according to one embodiment and FIG. 5 shows a simplified schematic side view of the objective lens changer 104. The objective lens changer 104 comprises a changer frame 130 arranged to be positioned with respect to the optical path of an optical apparatus, e.g. the housing 120, and an objective lens carrier 135 moveably attached to the frame by a mechanical link arrangement 140. The objective lens carrier 135 comprises two objective lens positions 145 that can be selectively positioned in the optical path by the mechanical link arrangement 140, whereby the objective lens changer allows switching between two different objective lenses 107a and 107b, e.g. of different magnification power.

In FIG. 4 the mechanical link arrangement 140 comprises a first link section 150, and a second link section 155 spaced apart from the first link section 150 in the direction of the optical axis. In one embodiment, disclosed in FIGS. 4 and 5, the first link section 150 comprises a lever arm 151 pivotally connecting the changer frame 130 and the objective lens carrier 135. The lever arm 151 is at one end pivotally connected to the changer frame 130 by a pivot axle 152, in FIG. 4 a section of the changer frame 130 including the connection to the pivot axle 152 has been cut away for illustrative purposes. Similarly, in FIG. 5 the pivot axle 152 is shown supported by an arm 131 of the changer frame 130 for illustrative purposes, but it should be understood that the changer frame may be of different shape. In FIG. 5 the angular position of the pivot axle 152 is indicated by an arrow. The lever arm 151 is at the opposite end pivotally connected to the objective lens carrier 135 by a pivot connection 153. The lever arm 151 is arranged for rotation between two end positions as is discussed in detail below with reference to FIGS. 6a-6e, each end position positioning the objective lens carrier 135 with an objective lens position 145 in the optical path. Thus the first link section 150 is arranged to provide translation of the objective lens carrier 135 between the objective lens positions 145 respectively. In one embodiment, the pivot axle 152 is connected to a motor (not shown) for driving the change of objectives. The motor may be any suitable type of motor, e.g. a stepper motor or the like, and it may be connected directly to the pivot axle 152 or by a suitable transmission arrangement. Other embodiments could involve a manually operated drive of the pivot axle 152, e.g. by providing an objective lens switch lever that can be operated manually by a user of the system.

In FIGS. 4 and 5 the second link section 155 comprises a lever arm 156 pivotally connecting the changer frame 130 and the objective lens carrier 135. The lever arm 156 is at one end pivotally connected to the changer frame 130 by a pivot axle 157, in FIG. 4 the pivot connection is specifically shown as a ball bearing, but it may essentially be comprised of any suitable axle connection. The lever arm 156 is at the opposite end pivotally connected to the objective lens carrier 135 by a pivot connection 158. The second link section 155 is arranged to allow the lever arm 151 to be rotated between two end positions and to control the alignment of the objective lens position 145 positioned in the optical path with respect to the optical axis.

In order to provide repeatable positioning at the respective objective positions 145, the mechanical link arrangement 140 may further be provided with kinematic positioning means. In FIGS. 4 and 5 kinematic positioning means are shown comprising a kinematic ball 161 attached to the changer frame 130 and a vee-block 160 at each objective position 145 of the objective lens carrier 135 arranged in mating relationship. In this way, the positioning of the objective with respect to the optical axis can be achieved in a very precise and repeatable manner as will be disclosed below with reference to FIGS. 6a-6e.

For imaging purposes, the objective lens changer 104 needs to hold the objective lens 107 in position in the optical path in a rigid manner. In one embodiment, mechanical link arrangement 140 is arranged to force the vee-block 160 on the objective lens carrier 135 against the kinematic ball 161 at the respective end positions to lock it in place. In one embodiment, the force is provided by controlling a motor (not shown) connected to the pivot axle 152 to try to move further than the mechanism will allow. The motor then acts as a spring holding the kinematic ball 161 and vee-block 160 together. According to one embodiment, wherein the motor is a stepper motor, a suitable preload is achieved when it is instructed to move one step beyond the hard stop position. In other embodiments, said spring effect may be obtained by providing compliant members in the assembly, such as a flexible motor mount, a compliant lever, or a compliant connection between the motor lever and the objective lens changer itself and the like.

In the present embodiment, as is indicated in FIG. 5 by dashed lines a-a and b-b, the objective lens 107a and 107b, the kinematic positioning means 160, 161, the pivot axle 152 and the pivot axle 158 are all centered on line a-a or b-b for the objective lens changer position arranged in the optical path. In this embodiment, the line a-a or b-b is further suitably aligned with the optical axis. However it should be noted that there is no geometrical requirement to arrange the above components and pivot axles along said lines a-a or b-b in order to ensure that each objective lens 107a or 107b is positioned in the correct position with respect to the optical axis when selected. The components and pivot axles may be positioned in alternative arrangements, as long as they ensure that each objective lens 107a or 107b is positioned in the correct position with respect to the optical axis when selected.

FIGS. 6a to 6b correspond to the schematic view of FIG. 5 and illustrate switching from a first to a second objective lens. FIG. 6a shows the objective lens changer 104 in a first position wherein the first (right hand) objective lens 107a is positioned in imaging position in the optical axis of an optical instrument (not shown). As disclosed above, in this position the first vee-block 160 of the objective lens carrier 135 is forced against the kinematic ball 161 to achieve a well-defined positioning of the first objective lens 107a. In FIG. 6b the pivot axle 152 has been rotated approximately 45° whereby the objective lens carrier 135 and the first objective lens 107a have essentially moved along the optical axis away from imaging position. In FIG. 6c the pivot axle 152 has been rotated approximately 90° whereby the switching is midways and the objective lens carrier 135 is now performing an angular movement with respect to the optical axis. Then in FIG. 6d the pivot axle 152 has been rotated approximately 135° whereby the objective lens carrier 135 and the second objective lens 107b are moving essentially along the optical axis, but now approaching the imaging position. Finally in FIG. 6e the objective lens carrier 135 and the second objective lens 107b have reached the second end point wherein the second vee-block 160 of the objective lens carrier 135 is forced against the kinematic ball 161.

From FIGS. 6a to 6e it can be concluded that one benefit of the present objective lens changer over the prior art is the initial withdrawal of the objective lens 107a and 107b from the imaging position when changing objective lens. This is especially beneficial for high magnification objectives that need to be very close to the object to be imaged. From FIGS. 6a to 6e it can further be concluded that the mechanical link arrangement 150 is arranged to move the objective lens carrier 135 in one plane and so that the translation between the objective lens positions 145 involves both an angular movement and a linear movement of the objective lens carrier 135 with respect to the optical axis.

Figure 7:
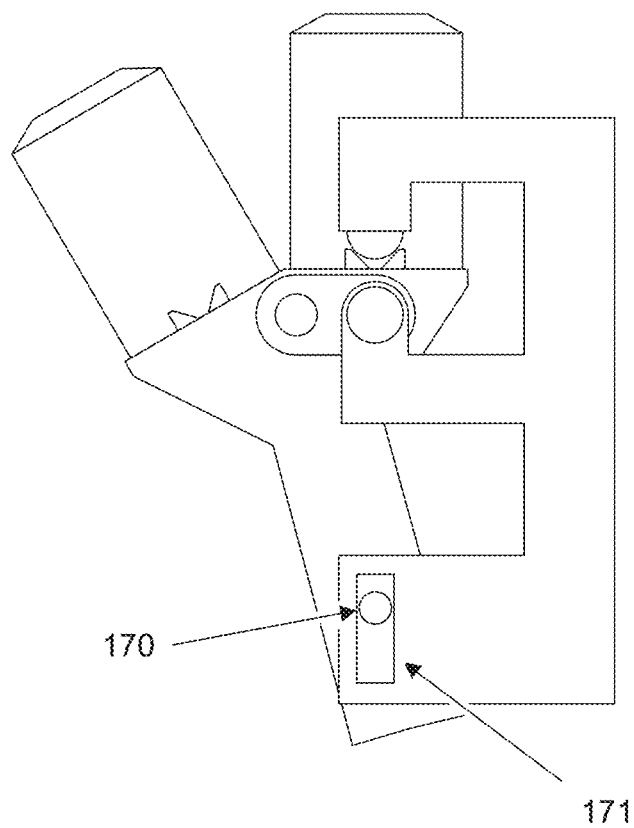
FIG. 7 is a schematic illustration of one embodiment of the objective lens changer according to the present invention.

FIG. 7 shows an embodiment of the present objective lens changer wherein the second link section 155 comprises a guide pin 170 attached to the objective lens carrier 135 and a groove 171 in the changer frame 130, and wherein the guide pin 170 is arranged for linear movement along the groove 171. Similar to the lever arm 156 disclosed in the above embodiment, the guide pin 170 and groove 171 are arranged to control the alignment of the objective lens position positioned in the optical path with respect to the optical axis.

Figure 8A:
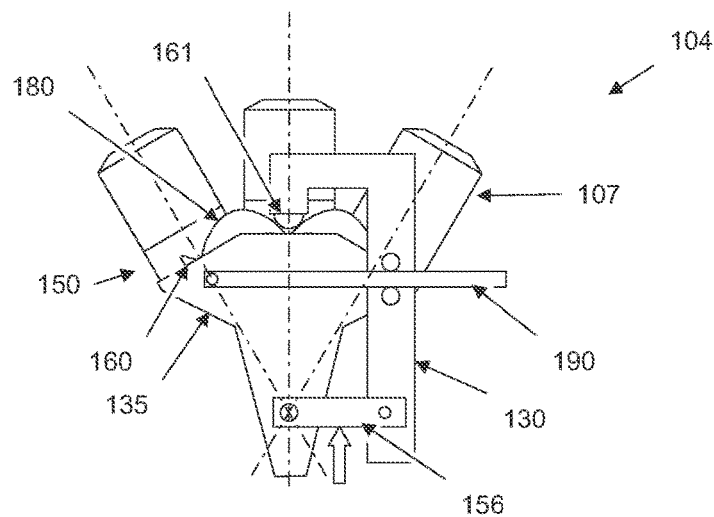
FIG. 8 is a schematic illustration of one embodiment of the objective lens changer according to the present invention.
Figure 8B:
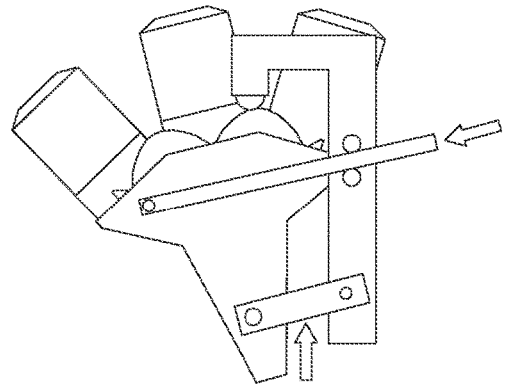
Figure 8C:
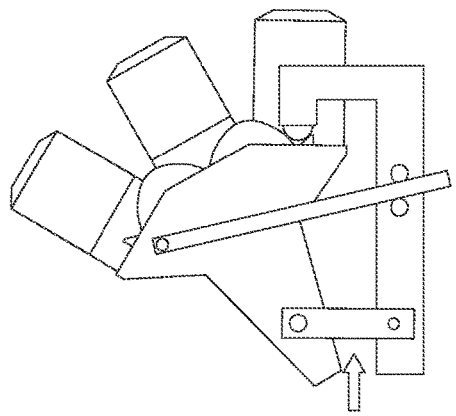

FIGS. 8a to 8c show an embodiment of the present objective lens changer wherein the first link section 150 comprises a cam profile 180 arranged on the objective lens carrier 135 and a cam-follower 161 on the changer frame 130. In the disclosed embodiment, the cam profile 180 is integrated with the vee-blocks 160 of the previous embodiments and the kinematic ball 161 is used as the cam-follower 161. However it should be noted that the cam profile 180 and the cam-follower 161 may be provided separately from the vee-blocks and the kinematic ball. In this embodiment, the objective lens carrier 135 is shown with three objective lenses 107, but it may be designed to carry two or any suitable number of objective lenses as long as there is space available in the optical instrument. In this embodiment, switching between the respective objective lenses is shown to be driven by a switch lever 190 connected to a suitable drive unit (not shown), whereas it is schematically illustrated that the force to hold the kinematic positioning means 160 and 161 in position may be applied via the lever arm 156.

According to one embodiment, there is provided an imaging system comprising an objective lens changer according to anyone of the above embodiments, and the imaging system may be a fluorescence imaging system.

The presently preferred embodiments of the invention are described with reference to the drawings, where like components are identified with the same numerals. The descriptions of the preferred embodiments are exemplary and are not intended to limit the scope of the invention.

Although the present invention has been described above in terms of specific embodiments, many modification and variations of this invention can be made as will be obvious to those skilled in the art, without departing from its spirit and scope as set forth in the following claims.

What is claimed is:

1. An objective lens changer for an optical instrument, the objective lens changer comprising:
a changer frame arranged to be positioned with respect to an optical path of the optical instrument,
an objective lens carrier moveably attached to the changer frame by a mechanical link arrangement, wherein the objective lens carrier can be selectively positioned in the optical path by the mechanical link arrangement to adopt at least two objective lens positions, wherein the mechanical link arrangement comprises a first link section to provide translation of the objective lens carrier between the objective lens positions and a second link section spaced apart from the first link section in the direction of an optical axis, and arranged to control an alignment of the objective lens position positioned in the optical path with respect to the optical axis, and wherein the mechanical link arrangement is arranged to move the objective lens carrier in one plane and so that the translation between the objective lens positions involves both an angular movement and a linear movement of the objective lens carrier with respect to the optical axis.

2. The objective lens changer according to claim 1 wherein the mechanical link arrangement comprises kinematic positioning means arranged to provide repeatable positioning at each objective position.

3. The objective lens changer according to claim 2 wherein the kinematic positioning means comprises a kinematic ball and a vee-block arranged in mating relationship.

4. The objective lens changer according to claim 1 wherein the second link section comprises a lever arm pivotally connecting the changer frame and the objective lens carrier.

5. The objective lens changer according to claim 1 wherein the second link section comprises a guide pin and groove arrangement connecting the changer frame and the objective lens carrier and allowing a translation of the objective lens carrier along the optical axis.

6. The objective lens changer according to claim 1 wherein the first link section comprises a lever arm pivotally connecting the changer frame and the objective lens carrier, the lever arm being arranged for rotation between two end positions, each positioning the objective lens carrier with an objective lens position in the optical path.

7. The objective lens changer according to claim 6 wherein the lever arm being driven for rotation between the two end positions by a drive motor arrangement or manually by a user.

8. The objective lens changer according to claim 1 wherein the first link section comprises a cam profile arranged on the objective lens carrier and a cam-follower on the changer frame.

9. The objective lens changer according to claim 6 wherein the objective lens carrier comprises three or more objective lens positions.

10. An imaging system comprising the objective lens changer according to claim 1.

11. A fluorescence imaging system comprising the objective lens changer according to claim 1.

* * * * *